(12) United States Patent
Leung

(10) Patent No.: US 7,870,276 B1
(45) Date of Patent: Jan. 11, 2011

(54) INTERFACE PLUGIN

(75) Inventor: Alan Kin Chung Leung, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 939 days.

(21) Appl. No.: 11/640,667

(22) Filed: Dec. 18, 2006

(51) Int. Cl.
*G06F 15/16* (2006.01)
*G06F 9/44* (2006.01)

(52) U.S. Cl. ............... 709/230; 709/236; 709/237; 717/120

(58) Field of Classification Search .......... 709/223, 709/237, 230, 236; 717/120, 170
See application file for complete search history.

(56) References Cited

U.S. PATENT DOCUMENTS

| | | | |
|---|---|---|---|
| 6,446,122 B1 * | 9/2002 | Rawat et al. | 709/224 |
| 6,487,723 B1 * | 11/2002 | MacInnis | 725/132 |
| 6,493,768 B1 * | 12/2002 | Boutcher | 719/330 |
| 6,513,159 B1 * | 1/2003 | Dodson | 717/178 |
| 6,519,767 B1 * | 2/2003 | Carter et al. | 717/140 |
| 6,564,048 B1 * | 5/2003 | Sugita | 455/414.3 |
| 6,842,903 B1 * | 1/2005 | Weschler | 719/328 |
| 7,107,594 B1 * | 9/2006 | Fischer et al. | 719/310 |
| 7,370,316 B2 * | 5/2008 | Kraiss et al. | 717/100 |
| 7,415,706 B1 * | 8/2008 | Raju et al. | 717/170 |
| 7,512,674 B1 * | 3/2009 | Jain et al. | 709/223 |
| 7,529,821 B1 * | 5/2009 | Cannon et al. | 709/223 |
| 7,627,867 B2 * | 12/2009 | Banks | 717/170 |
| 7,720,800 B2 * | 5/2010 | Fang et al. | 1/1 |
| 2006/0256759 A1 * | 11/2006 | Sayeedi | 370/335 |
| 2007/0011653 A1 * | 1/2007 | Fischer et al. | 717/120 |
| 2009/0100096 A1 * | 4/2009 | Erlichson et al. | 707/104.1 |
| 2009/0119388 A1 * | 5/2009 | Kikuchi et al. | 709/219 |

\* cited by examiner

*Primary Examiner*—Kristie D Shingles
(74) *Attorney, Agent, or Firm*—Chapin IP Law, LLC; Barry W. Chapin, Esq.

(57) ABSTRACT

Means are disclosed by which developers of network-analysis applications may develop network-analysis applications that can interface with multiple different versions of network-management applications, wherein each version of network-management application may have a different interface implementation, without having to be familiar with the different interface implementations. In particular embodiments disclosed herein, a network-analysis application requests and receives version information from a version of a network-management application. Based on the received version information, the network-analysis application selects version-dependent interface-implementation software and then integrates the selected version-dependent interface-implementation software with a version-independent interface-façade to produce an interface between the network-analysis application and the version of the network-management application.

14 Claims, 4 Drawing Sheets

INTERFACE PLUGIN

FIELD OF THE INVENTION

The present disclosure relates generally to interfacing a network-analysis application with a network-management application. Particular embodiments disclosed allow developers to develop the network-analysis application independently without requiring the developers to be knowledgeable of changes in interface implementations that may be different for each different version of the network-management application.

BACKGROUND OF THE INVENTION

Storage area networks ("SANs") are known in the art. In general, a storage area network includes data storage devices, such as disk array controllers and tape libraries, attached to servers, commonly referred to as host computers ("hosts"), via a communication infrastructure, such as a switching fabric. A storage area network also includes a SAN-management application, which organizes the connections in the communication infrastructure, the storage devices, and host computers so that data transfers are secure and robust. An important characteristic of a storage area network is that the storage devices are generally available to multiple hosts at the same time, which helps make a storage area network scalable and flexible. A typical SAN architecture works in a way that makes all storage devices available to all host computers on a LAN or WAN.

The host computers of a respective storage area network access data stored in respective data storage devices on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. Numerous hardware and software components must work in harmony in order for a user to successfully access data stored in a storage array of a storage area network. To access such data, a user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium of one or more switches (e.g., in a storage area network implementation) to a front-end adapter interface card resource operating on a high-capacity data storage array of the storage area network. The front-end adapter interface card receives the I/O requests and interprets them to identify appropriate data locations within specific storage device resources contained in the storage array. After the requested data is accessed from the storage devices, respective I/O responses are typically returned from the accessed storage system to the user application along an information or data flow path (based on operations and processing functionality provided by each of the aforementioned components and resources) in a reverse direction back to the application on the host computer running the client application.

SUMMARY OF THE INVENTION

Access to data in a conventional SAN involves reliance on a proper operation and coordination of a multitude of software and hardware resources in a SAN to retrieve data from storage and serve the data to a client. The complexity of many SANs may be increased as resources obtained from a particular manufacturer are added to a heterogeneous SAN that includes resources from other manufacturers. If even a single resource such as a switch, operating system, host bus adapter, storage system, etc. in a respective SAN is incompatible with other hardware and/or software resources present in the SAN, then the SAN may no longer operate properly and enable a respective user to retrieve stored data.

To help SAN administrators analyze a particular SAN, SAN vendors generally provide SAN-management applications. SAN-management applications generally provide an interface to discover, monitor, and configure complex heterogeneous SAN environments, allowing IT administrators to streamline SAN-management operations. SAN-management applications may comprise a plurality of software applications that are distributed with the SAN to manage or administer various resources (e.g, storage devices, switches, hosts, etc.) An example of a SAN-management application is EMC's SAN Manager, provided as part of EMC's Control Center ("ECC"). ECC is manufactured by EMC Corporation of Hopkinton, Mass., USA.

An important function of a SAN-management application is to collect and store management data that can be analyzed to help a SAN administrator manage a SAN. Management data may include, for example, information about individual resources, configuration information, or performance data. The management data is typically stored in a SAN-management database where it can be later retrieved and analyzed.

To help ensure that a SAN will work properly (e.g., so that the SAN enables users to access corresponding stored data), SAN vendors have begun developing SAN-analysis applications that can access and analyze SAN-management data. For example, a SAN-analysis application may access configuration data for an existing SAN and validate the configuration against interoperability rules, availability rules, and array configuration best practices. Thus, a SAN-analysis application may, for example, help an administrator identify incompatibilities in a SAN configuration that might cause operational problems in the SAN. An example of a SAN-analysis application is EMC's SAN Advisor, provided as part of ECC.

As vendors continue to improve, enhance, and upgrade SAN-management applications, the vendors generally release different versions of their SAN-management applications. Each version may implement differently the manner in which management data is collected, stored, and accessed. That is, each version may have a different implementation of the interface to discover, monitor, and configure SAN environments. Developers of conventional SAN-analysis applications must keep track of the different interface implementations in order to develop a SAN-anlysis application that is capable of accessing management data properly.

Inventive matter discussed herein deviates with respect to and improves upon conventional technology such as discussed above and other technology also known in the prior art. Embodiments disclosed herein provide means by which developers of SAN-analysis applications may develop SAN-analysis applications that can interface with multiple different versions of SAN-management applications, wherein each version may have a different interface implementation, without having to be familiar with the different interface implementations. Although embodiments are described herein in their application to storage area networks, one of ordinary skill in the art will readily recognize their applicability to other types of networks as well.

In a first embodiment, methods are disclosed that are useful in integrating a network-analysis application with a version of a network-management application. Such methods comprise requesting version information from a version of a network-management application and receiving the requested version information. Based on the received version information, version-dependent interface-implementation software is selected. The selected version-dependent interface-implementation software is then integrated with a version-independent interface-façade for a network-analysis application to produce an interface between the network-analysis application and the version of the network-management application.

In a second embodiment, logic is disclosed that is operable to perform methods and process disclosed herein. It is to be understood that the inventive matter disclosed herein may be embodied strictly as computer software, as computer software and hardware, or as hardware alone. In a third embodiment, computer systems are disclosed that are enabled to perform methods and processes disclosed herein. The inventive matter disclosed herein may be embodied in EMC's Control Center and may also be implemented in computer devices that operate in connection with EMC's Control Center.

BRIEF DESCRIPTION OF THE DRAWINGS

The above and further objects, features, and advantages of disclosed embodiments may be better understood by referring to the following description in conjunction with the accompanying drawings, in which like reference characters indicate like structural elements and features in the various figures. The drawings are not meant to limit the scope of the invention. For clarity, not every element may be labeled in every figure. The drawings are not necessarily to scale, emphasis instead being placed upon illustrating embodiments, principles, and concepts.

DESCRIPTION OF EXAMPLE EMBODIMENTS

Figure 1:
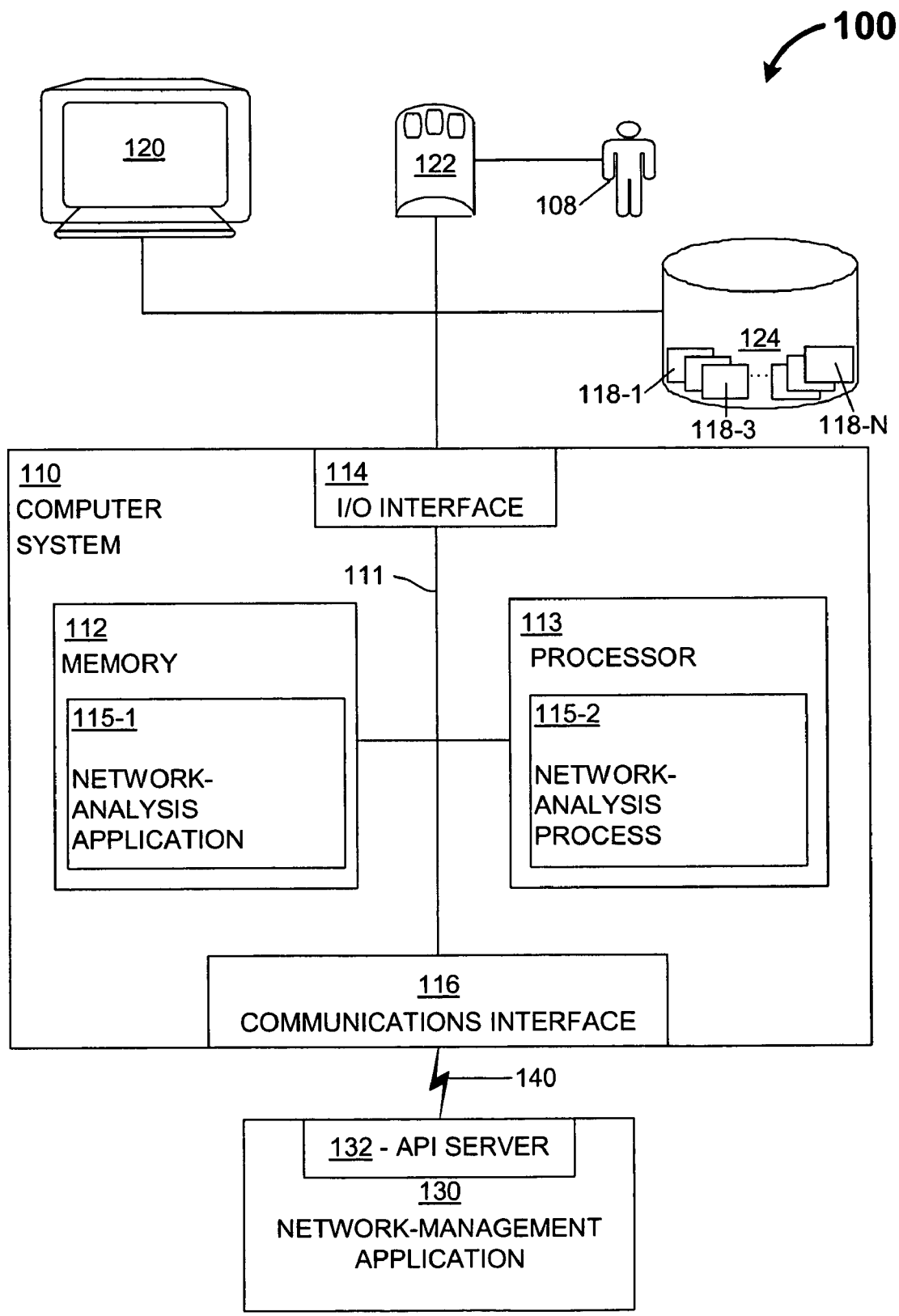
FIG. 1 is a block diagram of a computer environment illustrating an example architecture of a respective computer system useful for implementing a network-analysis application in accordance with embodiments disclosed herein.

FIG. 1 is a block diagram of a computer environment 100 illustrating an example architecture of a respective computer system 110 useful for implementing a network-analysis application 115-1 according to embodiments disclosed herein. Computer system 110 can be a computerized device such as a personal computer, workstation, portable computing device, console, network terminal, processing device, etc. As shown, computer system 110 of the present example includes an interconnect 111, such as a data bus or other circuitry, that couples a memory system 112, a processor 113, I/O interface 114, and a communications interface 116. An input device 122 (e.g., one or more user/developer-controlled devices such as a keyboard, mouse, touchpad, trackball, etc.) couples to the processor 113 through the I/O interface 114 and enables a user 108, such as a network administrator or network designer, to provide input commands and generally interact with a graphical user interface that the network-analysis application 115-1 and the network-analysis process 115-2 provide on a display 120. I/O interface 114 potentially provides connectivity to peripheral devices such as the input device 122, display screen 120, etc. Communications interface 116 enables computer system 110 to communicate with the applications programming interface ("API") 132 of a network-management application 130 over the communication link 140.

As shown, memory system 112 can be any type of computer-readable medium and in this example is encoded with network-analysis application 115-1 that supports functionality as herein described. Network-analysis application 115-1 can be embodied as computer software code such as data and/or logic instructions (e.g., code stored in the memory or on another computer-readable medium such as a disk) that supports processing functionality according to different embodiments described herein. During operation of the computer system 110, processor 113 accesses the memory system 112 via the interconnect 111 in order to launch, run, execute, interpret, or otherwise perform the logic instructions of the network-analysis application 115-1. Execution of the network-analysis application 115-1 produces processing functionality in a network-analysis process 115-2. In other words, the network-analysis process 115-2 represents one or more portions of the network-analysis application 115-1 performing within or upon the processor 113 in the computer system 110. Those skilled in the art will understand that the computer system 110 can include other processes and/or software and hardware components, such as an operating system that controls allocation and use of hardware resources.

It should be noted that, in addition to the network-analysis process 115-2 that carries out method operations as discussed herein, other embodiments herein include the network-analysis application 115-1 itself (i.e., the un-executed or non-performing logic instructions and/or data). The network-analysis application 115-1 may be stored on a computer-readable storage medium such as a floppy disk, hard disk, or in an optical storage medium. According to other embodiments, the network-analysis application 115-1 can also be stored in a memory type system such as in firmware, read only memory (ROM), or, as in this example, as executable code within the memory system 112 (e.g., within Random Access Memory or RAM). Thus, it should be understood that embodiments disclosed herein include logic encoded in one or more tangible media for execution and, when executed, operable to perform methods and processes disclosed herein. Such logic may be embodied strictly as computer software, as computer software and hardware, or as hardware alone.

The computer system 110 is communicatively connected to a network-management application 130 via a communications link 140. The network-management application 130 includes an application programming interface ("API")

server 132. The analysis process 115-2 can retrieve management data, such as network configuration information, by sending data requests over the communications link 140 to the network-management application 130. The type of communications link 140 may include, for example, communications links of the prior art such as is found in LANs and WANs. The API server 132 can receive and respond to the data requests from the network-analysis process 115-2. Communication links may also be referred to herein as communication channels without loss of meaning.

The computer environment 100 also includes a storage device 124 for storing a plurality of different versions of interface-implementation software 118-1 to 118-N that can be used in producing an integrated interface with the network-management application 130. Developers of the network-management application 130 can implement the interface-implementation versions 118-1 to 118-N and distribute them along with the network-analysis application 115-1. Each different version of the network-management application 130 will have an interface-implementation version 118 associated with it.

Functionality supported by computer system 110 and, more particularly, functionality associated with network-analysis application 115-1 and network-analysis process 115-2 is herein discussed in relation to FIGS. 1-4. For purposes of the following discussion, computer system 110 (e.g., network-analysis application 115-1 and/or network-analysis process 115-2) generally performs procedures in FIGS. 3-4. However, other systems can be configured to provide similar functionality.

Figure 2:
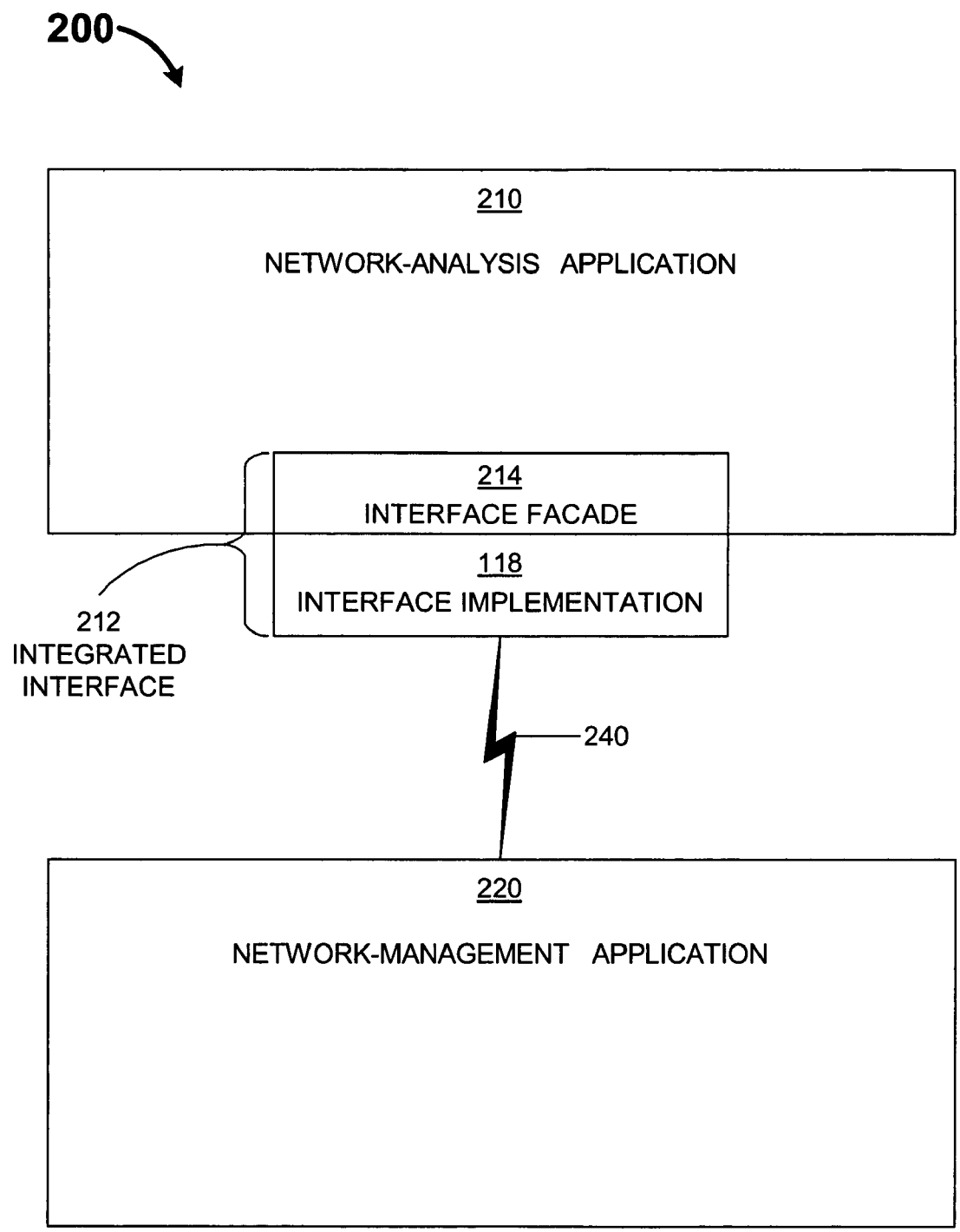
FIG. 2 is a block diagram illustrating a network-analysis application communicatively connected to a network-management application in accordance with embodiments disclosed herein.

FIG. 2 is a block diagram illustrating a network-analysis application 210 communicatively connected to a network-management application 220 through an integrated interface 212 over a communications link 240. The integrated interface 212 comprises two parts: an interface façade 214 and an interface implementation 118. The interface façade 214 is generally static. That is, the interface façade 214 can be integrated with different versions of interface implementation, allowing the network-analysis application 210 to be communicatively connected to different versions of the network-management application 220.

In particular embodiments, the interface façade 214 comprises at least one identifier of a software class that may be invoked by the network-analysis application 210 to retrieve management data from the network-management application 220. In these embodiments, the at least one software class identified in the interface façade 214 may have a different implementation depending on to which version of the network-management application 220 the network-analysis application 210 is communicatively connected. For example, in particular embodiments, different interface implementations 118 are stored in different Java archive ("JAR") files with each JAR file containing an implementation of the at least one software class identified in the interface façade 214. JAR files are known in the art of computing and generally comprise a AIP file used to distribute a set of Java classes. JAR files can be used to store compiled Java classes and associated metadata that can constitute a software program. The network-analysis application 210 can communicatively connect to the network-management application 220 by first acquiring version information from the network-management application 220 and then using the acquired version information to determine which JAR file needs to be loaded to implement the at least one software class identified in the interface façade 214. That is, the network-analysis application 210 may instantiate the at least one software class identified in the interface façade 214 by loading the appropriate JAR file.

In this manner, the developers of the network-analysis application 210 may develop the network-analysis application 210 knowing which software class(es) can be invoked to retrieve management data from the network-management application 220 without having to know, during development, the implementation details of retrieving the management data from different versions of the network-management application 220. The interface façade 214 provides a consistent interface to the network-analysis application 210 regardless of which version of the network-management application 220 the network-analysis application 210 is interfacing with. In this manner, a developer of the network-analysis application 210 can write code using particular class names, method calls, procedure calls, etc. that are designed to query the network-management application 220 without having to worry about which version of the network-management application 220 is being queried.

Figure 3:
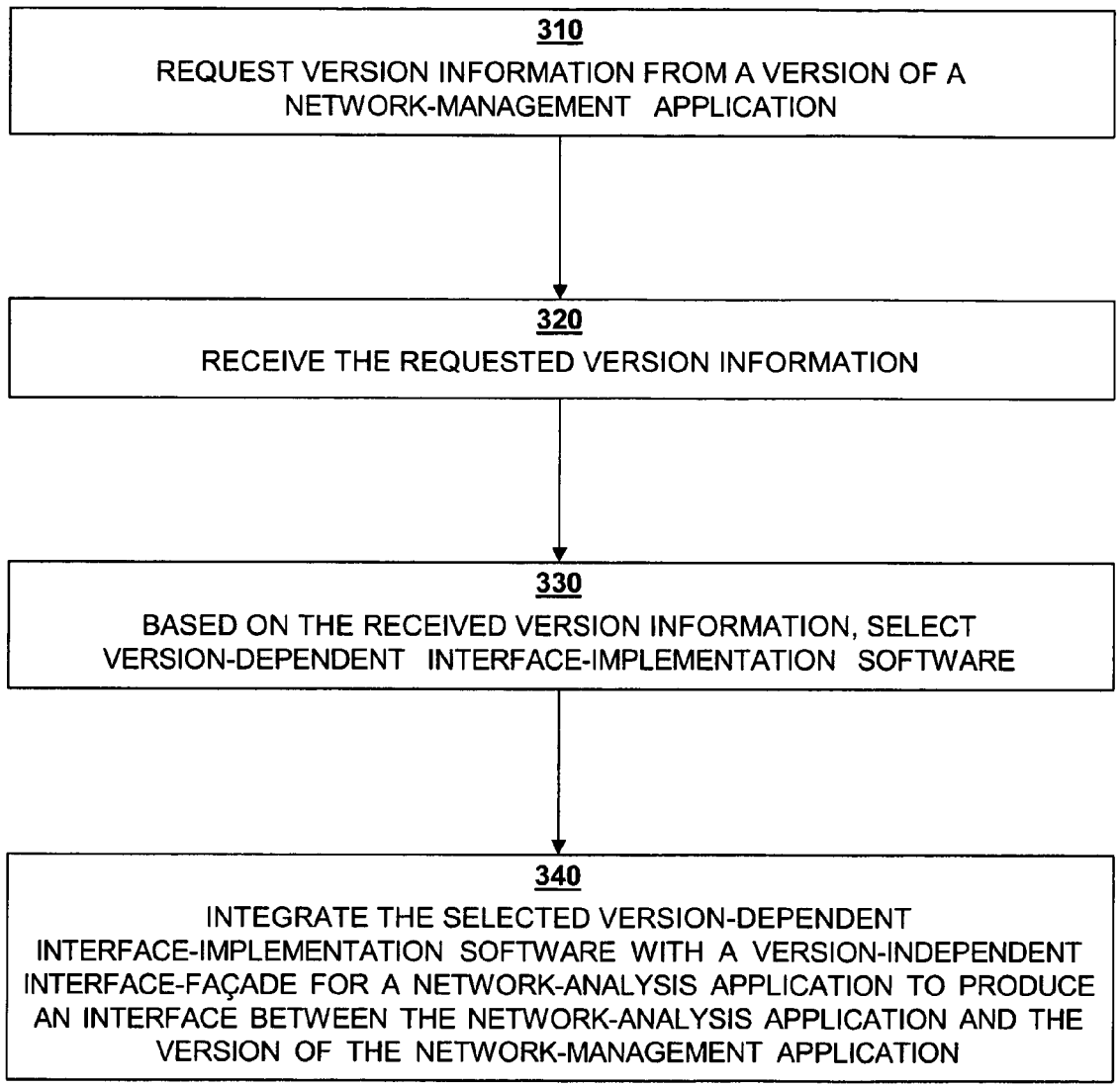
FIG. 3 shows a flowchart illustrating a first method for integrating a network-analysis application with a network-management application in accordance with embodiments disclosed herein.

FIG. 3 illustrates procedures performable by a network-analysis application for integrating a network-analysis application with a network-management application in accordance with embodiments disclosed herein. The procedures may be performed by a network-analysis application such as the network-analysis application 115-1 of FIG. 1 or the network-analysis application 210 of FIG. 2. The network-analysis application may be a SAN-analysis application, for example. In step 310, the network-analysis application requests version information from a version of a network-management application. The network-management application may be a SAN-management application, for example. In step 320, the network-analysis application receives the requested version information. In particular embodiments, the received version information will be sufficient to allow the network-analysis application to choose an interface implementation for the network-management application from which the version information is received. In step 330, the network-analysis application selects version-dependent interface-implementation software. This selection is based on the received version information. For example, based on the received version information, the network-analysis application may select one of a plurality of JAR files. The selected JAR file will contain interface-implementation software for the particular version of the network-management application with which the network-analysis application is attempting to interface. In step 340, the network-analysis application integrates the selected version-dependent interface-implementation software with its interface-façade, which is version independent. This integration produces an interface between the network-analysis application and the version of the network-management application.

Figure 4:
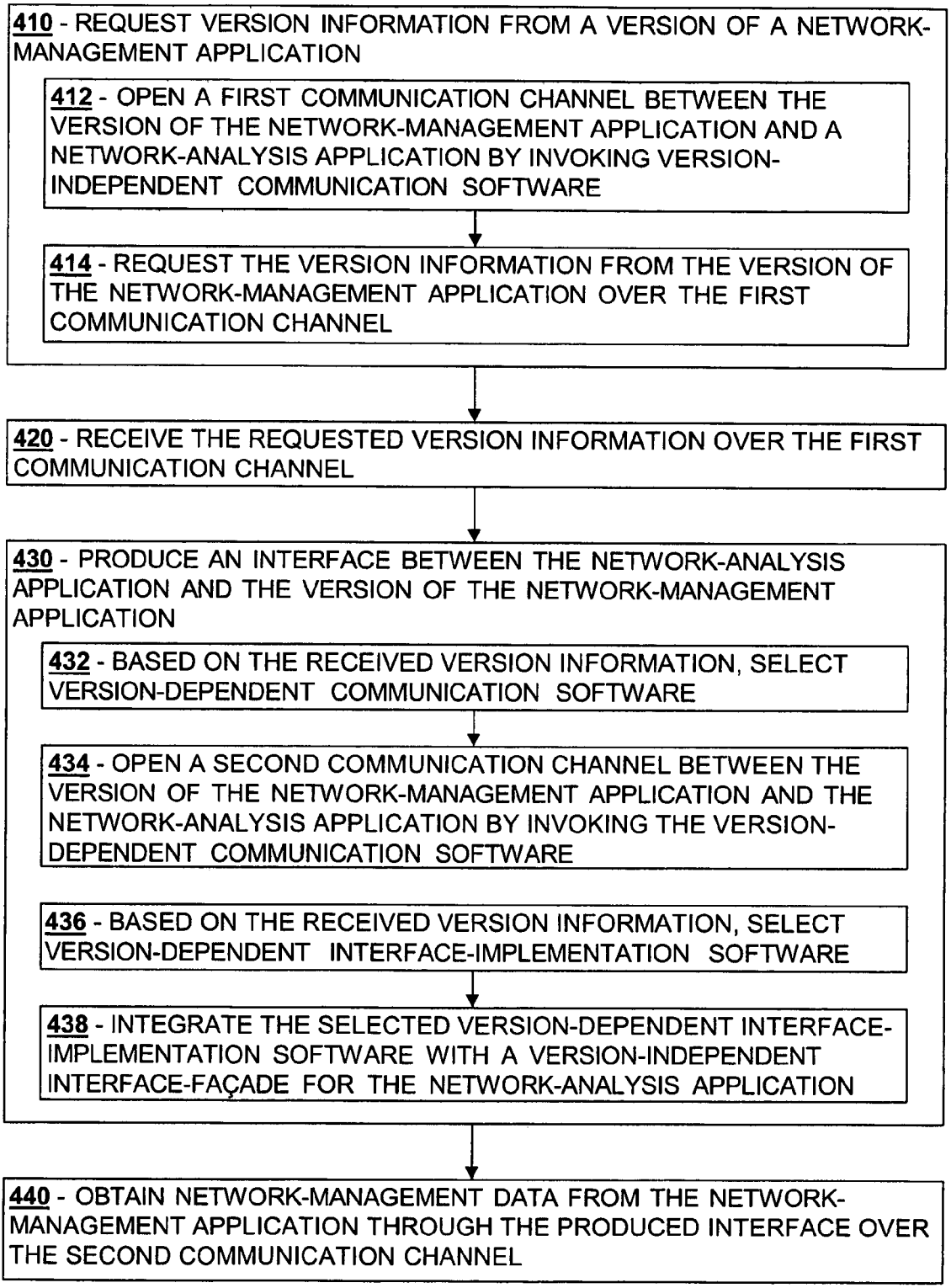
FIG. 4 shows a flowchart illustrating a second method for integrating a network-analysis application with a network-management application in accordance with embodiments disclosed herein.

FIG. 4 illustrates additional procedures performable by a network-analysis application for integrating a network-analysis application with a network-management application in accordance with embodiments disclosed herein. The procedures may be performed by a network-analysis application such as the network-analysis application 115-1 of FIG. 1 or the network-analysis application 210 of FIG. 2. The network-analysis application may be a SAN-analysis application, for example. The procedures of FIG. 4 may be particular advantageous when the communications link between the network-analysis application and the network-management application is dependent on the version of the network-management application.

In step 410, the network-analysis application requests version information from a version of a network-management application. In particular embodiments, step 410 may comprise step 412 and step 414. In step 412, the network-analysis application opens a first communication channel between the network-analysis application and the version of the network-management application by invoking version-independent communication software. This communication must be version independent because, at this point, the network-analysis application is unaware of which version of the network-management application with which it is attempting to interface. Once this first communication channel is opened, the network-analysis application, in step 414, may request the version information from the version of the network-management application over the first communication channel. In step 420, the network-analysis application receives the requested version information over the first communication channel. In particular embodiments, this first communication channel may only be used to request and receive version information and may be discarded after the version information is received.

In step 430, an interface between the network-analysis application and the version of the network-management application is produced. In particular embodiments, step 430 may comprise step 432, step 434, step 436, and step 438. In step 432, the network-analysis application selects version-dependent communication software. This selection is based on the received version information. In step 434, a second communication channel between the version of the network-management application and the network-analysis application is opened by invoking the version-dependent communication software. In step 436, the network-analysis application selects version-dependent interface-implementation software with the version-independent interface-façade of the network-analysis application. This selection is based on the received version information and, in particular embodiments, may be performed in the same manner as step 330. In step 340, the network-analysis application integrates the selected version-dependent interface-implementation software with its interface-façade, which is version independent. This, integration produces an interface between the network-analysis application and the version of the network-management application. In step 440, the network-analysis application obtains network-management data from the network-management application through the produce interface over the second communication channel. The network-analysis application can then analyze the obtained network-management data in attempting to make recommendation about the network being managed by the network-management application.

In accordance with embodiments described herein, means are disclosed by which developers of network-analysis applications may develop network-applications that can interface with multiple different versions of network-management applications, wherein each version may have a different interface implementation, without having to be familiar with the different interface implementations. While inventive matter has been shown and described herein with reference to specific embodiments thereof, it should be understood by those skilled in the art that variations, alterations, changes in form and detail, and equivalents may be made or conceived of without departing from the spirit and scope of the inventive matter. The foregoing description of the inventive matter is not intended to be limiting. Rather, the scope of the inventive matter should be assessed as that of the appended claims and by equivalents thereof.

What is claimed is:

1. A method comprising:
  requesting, from a network-analysis application executed by a processor device in a computer, version information from a version of a network-management application;
  receiving the requested version information;
  based on the received version information, selecting version-dependent interface-implementation software; and
  integrating the selected version-dependent interface-implementation software with a version-independent interface-facade for the network-analysis application to produce an interface between the network-analysis application and the version of the network-management application;
  wherein requesting version information comprises:
  obtaining version independent communication software;
  via the version independent communication software, opening a first communication channel between the network-analysis application and the network-management application; and
  obtaining the version information from the network-management application via communications over the first communication channel;
  wherein integrating the selected version-dependent interface-implementation software with the version-independent interface-facade includes:
  utilizing the version-dependent interface-implementation software to create a second communication link between the network-analysis application and the network-management application, the second communication link directly coupling the version-dependent interface-implementation software and the network-management application, the version-independent interface-facade coupling the network-analysis application to the version-dependent interface-implementation software.

2. The method of claim 1, wherein receiving the requested version information comprises:
  receiving version information sufficient to identify the version as one of a plurality of versions of the network-management application, wherein each of the plurality of versions of the network-management applications requires different interface software.

3. The method of claim 1, comprising:
  obtaining network-management data from the network-management application through the produced interface over the second communication channel.

4. The method of claim 1, wherein integrating the selected version-dependent interface-implementation software with the version-independent interface-facade comprises:
  instantiating at least one software class, an identifier of the at least one software class being included in the interface-facade.

5. The method as in claim 1, further comprising: via communications from the network-analysis application through the version-independent interface-facade to the version-dependent interface-implementation software, forwarding queries from the version-dependent interface-implementation software over the second communication link to the network-analysis application.

6. The method as in claim 5, wherein the version-independent interface-facade comprises at least one identifier of a software class that may be invoked by the network-analysis application to retrieve management data from the network-management application;
  storing different interface implementations in different Java archive files, each Java archive file including an implementation of the at least one software class identified in the version-independent interface-facade, the network-analysis application communicatively connected to the network-management application by first acquiring version information from the network-management application and then using the acquired version information to determine which of the Java archive files is to be loaded in the version-independent interface-facade to implement the software class identified in the version-independent interface-facade; and wherein the network-analysis application instantiates the software class identified in the version-independent interface-facade by selecting the version-dependent interface-implementation software, the version-dependent interface-implementation software being one of the different Java archive files.

7. The method as in claim 5 further comprising:

instantiating a software class in the version-independent interface facade;

wherein the selected version-dependent interface-implementation software supports the software class.

8. The method as in claim 7 further comprising:

integrating the version-independent interface-facade with multiple different versions of the version-dependent interface-implementation software for different versions of the network-management application.

9. A computer system comprising:

a processor;

a memory unit that stores instructions associated with an application executed by the processor; and an interconnect coupling the processor and the memory unit, enabling the computer system to execute the application and perform operations of:

requesting version information from a version of a network-management application;

receiving the requested version information;

based on the received version information, selecting version-dependent interface-implementation software; and integrating the selected version-dependent interface-implementation software with a version-independent interface-facade for a network-analysis application to produce an interface between the network-analysis application and the version of the network-management application;

wherein requesting version information from a version of a network-management application comprises:

opening a first communication channel between the version of the network-management application and the network-analysis application by invoking version-independent communication software; and requesting the version information from the version of the network-management application over the first communication channel, and wherein integrating the selected version-dependent interface-implementation software with the version-independent interface-facade for the network-analysis application to produce the interface between the network-analysis application and the version of the network-management application comprises:

based on the received version information, selecting version-dependent communication software;

opening a second communication channel between the version of the network-management application and the network-analysis application by invoking the selected version-dependent communication software; and obtaining network-management data from the network-management application through the produced interface over the second communication channel.

10. The computer system of claim 9, wherein receiving the requested version information comprises:

receiving version information sufficient to identify the version as one of a plurality of versions of the network-management application, wherein each of the plurality of versions of the network-management applications requires different interface software.

11. The computer system of claim 9, wherein the method comprises: obtaining network-management data from the network-management application through the produced interface over the opened communication channel.

12. The computer system of claim 9, comprising: obtaining network-management data from the network-management application through the produced interface over the second communication channel.

13. The computer system of claim 9, wherein integrating the selected version-dependent interface-implementation software with the version-independent interface-facade comprises:

instantiating at least one software class, an identifier of the at least one software class being included in the interface-facade.

14. Software encoded in one or more computer-readable storage media for execution and, when executed in a computer processor, operable to perform steps of:

requesting version information from a version of a network-management application;

receiving the requested version information;

based on the received version information, selecting version-dependent interface-implementation software; and integrating the selected version-dependent interface-implementation software with a version-independent interface-facade for a network-analysis application to produce an interface between the network-analysis application and the version of the network-management application;

wherein requesting version information comprises:

obtaining version independent communication software;

via the version independent communication software, opening a first communication channel between the network-analysis application and the network-management application; and obtaining the version information from the network-management application via communications over the first communication channel;

wherein integrating the selected version-dependent interface-implementation software with the version-independent interface-facade includes:

utilizing the version-dependent interface-implementation software to create a second communication link between the network-analysis application and the network-management application, the second communication link directly coupling the version-dependent interface-implementation software and the network-management application, the version-independent interface-facade coupling the network-analysis application to the version-dependent interface-implementation software.

* * * * *